United States Patent
Meister et al.

(10) Patent No.: US 9,817,295 B2
(45) Date of Patent: Nov. 14, 2017

(54) INJECTION MODULATOR

(71) Applicants: TECHNISCHE UNIVERSITAET BERLIN, Berlin (DE); SICOYA GMBH, Berlin (DE)

(72) Inventors: Stefan Meister, Berlin (DE); Aws Al-Saadi, Berlin (DE); Sebastian Kupijai, Berlin (DE); Christoph Theiss, Berlin (DE); Hanjo Rhee, Berlin (DE); Lars Zimmermann, Berlin (DE); David Stolarek, Frankfurt (DE)

(73) Assignees: TECHNISCHE UNIVERSITAT BERLIN, Berlin (DE); SICOYA GMBH, Berlin (DE)

( * ) Notice: Subject to any disclaimer, the term of this patent is extended or adjusted under 35 U.S.C. 154(b) by 0 days.

(21) Appl. No.: 15/512,873

(22) PCT Filed: Sep. 21, 2015

(86) PCT No.: PCT/DE2015/200460
§ 371 (c)(1),
(2) Date: Mar. 21, 2017

(87) PCT Pub. No.: WO2016/045675
PCT Pub. Date: Mar. 31, 2016

(65) Prior Publication Data
US 2017/0299939 A1    Oct. 19, 2017

(30) Foreign Application Priority Data
Sep. 24, 2014  (DE) .................. 10 2014 219 295

(51) Int. Cl.
*G02F 1/025* (2006.01)
*G02F 1/225* (2006.01)
(Continued)

(52) U.S. Cl.
CPC ............ *G02F 1/2257* (2013.01); *G02F 1/025* (2013.01); *H04B 10/548* (2013.01); *G02F 2001/212* (2013.01); *G02F 2201/063* (2013.01)

(58) Field of Classification Search
None
See application file for complete search history.

(56) References Cited

U.S. PATENT DOCUMENTS 9,065,007 B2 * 6/2015 Menezo .............. G02B 6/4215
9,195,112 B2   11/2015 Meister et al.
(Continued)

FOREIGN PATENT DOCUMENTS

DE    102011005422    9/2012

OTHER PUBLICATIONS

International Search Report for PCT/DE2015/200460, English translation attached to original, Both completed by the European Patent Office on Feb. 17, 2016, All together 7 pages.
(Continued)

*Primary Examiner* — Michelle R Connelly
(74) *Attorney, Agent, or Firm* — Brooks Kushman P.C.

(57) ABSTRACT

An injection modulator for modulation of optical radiation, having an optical waveguide and a diode structure, having at least two p-doped semiconductor portions, at least two n-doped semiconductor portions and at least one lightly or undoped intermediate portion between the p-doped and n-doped portions. The p-doped portions when viewed in the longitudinal direction of the waveguide are offset with respect to the n-doped portions and the diode structure is arranged in a resonance-free portion of the waveguide. The p-doped portions lie on one side of the waveguide, the n-doped portions lie on the other side of the waveguide and the intermediate portion lies in the center, each portion extends transversely with respect to the waveguide longitu-
(Continued)

dinal direction in the direction of the waveguide center of the waveguide and no p-doped portion when viewed in the longitudinal direction of the waveguide overlaps any n-doped portion.

15 Claims, 7 Drawing Sheets

(51) Int. Cl.
   *H04B 10/548* (2013.01)
   *G02F 1/21* (2006.01)

(56) References Cited

U.S. PATENT DOCUMENTS

| | | | |
|---|---|---|---|
| 9,575,339 B2* | 2/2017 | Gill | G02F 1/025 |
| 2005/0123227 A1* | 6/2005 | Vonsovici | G02F 1/025 |
| | | | 385/2 |
| 2014/0127842 A1 | 5/2014 | Song et al. | |
| 2014/0241656 A1* | 8/2014 | Meister | G02F 1/025 |
| | | | 385/2 |
| 2015/0056740 A1* | 2/2015 | Menezo | G02B 6/4215 |
| | | | 438/69 |

OTHER PUBLICATIONS

Li et al. Optics Express Aug. 31, 2009, vol. 17, No. 18, pp. 15947-15958, XP 55026582, "Silicon Waveguide Modulator based on Carrier Depletion in Periodically Interleaved PN Junctions".
Liu et al. Optics Express Jan. 22, 2007, vol. 15, No. 2, pp. 660-668, "High-speed optical modulation based on carrier depletion in a silicon waveguide".
Xu et al. Nature May 19, 2005, vol. 435, pp. 325-327, "Micrometre-scale silicon electro-optic modulator".
Schmidt et al. Optics Express Mar. 19, 2007, vol. 15, No. 6, pp. 3140-3148, "Compact electro-optic modulator on silicon-oninsulator substrates using cavities with ultrasmall modal volumes".
Reed et al. Nature Photonics Aug. 2010, vol. 4, pp. 518-526, "Silicon optical modulators".
Soref et al. IEEE Journal of Quantum Electronics Jan. 1987, vol.QE-23, No. 1, pp. 123-129, "Electrooptical Effects in Silicon".
Dainesi et al. IEEE Photonics Technolgy Letters Jun. 2000, vol. 12, No. 6, pp. 660-662, "CMOS Compatible Fully Integrated Mach-Zehnder Interferometer in SOI Technology".

* cited by examiner

INJECTION MODULATOR

CROSS-REFERENCE TO RELATED APPLICATION

This application is the U.S. national phase of PCT Application No. PCT/DE2015/200460 filed on Sep. 21, 2015, which claims priority to DE Patent Application No. 10 2014 219 295.1 filed on Sep. 24, 2014, the disclosures of which are incorporated in their entirety by reference herein.

The invention relates to an injection modulator for modulating optical radiation.

For the modulation of optical signals in conjunction with waveguides, there are multiple fields of application, such as, for example, in communication technology, sensor systems, image transmission, etc. Electro-optical modulators integrated in particular in semiconductor materials (such as e.g. silicon, InP, GaAs) play an important part here. Electro-optical modulators, based on silicon waveguides, are increasingly attracting interest since they constitute a key component for optical broadband transmission for so-called on-chip, chip-to-chip, fiber communication, etc. With optical connections it is possible to achieve significantly higher bandwidths, with moderate energy consumption, compared with the metal-based connections customary heretofore.

Various designs are known for light modulator components for such transmission links. The best known designs are Mach-Zehnder modulators (Liu et al., Optics Express, 15, 660, 2007), ring resonators (Xu et al. Nature, 435, 325, 2005) and Fabry-Perot resonators (Schmidt et al., Optics Express, 16, 334, 2008).

Mach-Zehnder modulators are often used in message transmission at high data rates. The major advantage of Mach-Zehnder modulators resides in the high optical bandwidth, i.e. the high tolerance of the modulators with respect to changes in wavelength of the light to be modulated and the high achievable modulation depth (of the extinction ratio).

In the waveguide-based Mach-Zehnder modulators (Liu et al. Optics Express, 15, 660, 2007), the light passes through an electro-optical material in at least one arm of the modulator. The refractive index (or else the absorption) of the electro-optical material can be varied by applying a voltage. As a result, the light wave experiences a phase shift in said arm. If the phase shift is $\pi$ (or an odd, integer multiple of $\pi$) relative to the light wave which passes through the other arm of the modulator, destructive interference occurs at an output of the Mach-Zehnder modulator when the two waves are superimposed. The modulator may be operated between states of constructive and destructive interference, also called amplitude modulation. Furthermore, the modulator structure may also be operated between states of the same amplitude, but different phases, also called phase modulation. Likewise, it is also possible to switch between combinations of these states. This is generally used to increase the bits transmittable with a symbol (also higher modulation formats). In order to achieve a phase shift of $\pi$, the light has to pass through a path length, usually in the millimeters to centimeters range, in the electro-optical material. Said path length and thus the minimum structural length of a Mach-Zehnder modulator are dependent on the intensity of the electro-optical effect.

In order to generate the electro-optical effect, in the semiconductor material regions in or near the waveguide are doped. In this regard, by way of example, in silicon-on-insulator (SOI) waveguides, a p-i-n or else p-n diode structure is produced by means of doping (Reed et al., Nature Photonics, 4, 518, 2010). Using such diode structures, the charge carrier concentration in the waveguides may be varied in a targeted manner. As a result of the so-called free carrier plasma dispersion effect, this leads to a variation of the refractive index and of the absorption behavior in the waveguide (Soref et al., IEEE J. Quant. Electron., 23, 123, 2004). In this case, by applying a voltage to the diode in the forward direction, it is possible to inject charge carriers into the waveguide (referred to as injection) or, by applying a voltage to the diode in the reverse direction, it is possible to extract charge carriers from the waveguide (referred to as depletion).

In electro-optical light modulators according to the "depletion" principle, the waveguide core itself is p- and/or n-doped. The light is modulated by a reduction of the charge carriers in the optical waveguide. It is known that very high modulation speeds may be achieved by the extraction of the charge carriers in depletion modulators. However, the doping of the waveguide core leads to a high absorption and thus to high optical losses.

A publication by Z.-Y. Li et al. (Opt. Express 17, 15947, 2009) discloses alternating p- and n-doped regions of a p-n diode in a depletion modulator which can be used to extend the length of the "depletion zone" in the p-n junction relative to the waveguide. As a result, the electro-optical effect may be increased and the structural size of the modulator may thus be reduced. The modulation speed of the modulator cannot be increased by this arrangement.

An injection modulator having the features according to the preamble of patent claim 1 is known from the publication "CMOS compatible fully integrated Mach-Zehnder interferometer in SOI technology" P. Dainesi et IEEE Photonics Technology Letters, Vol. 12, No. June 2000.

The invention is based on the object of specifying an injection modulator in which it is possible to achieve a fast and large modulation effect with at the same time comparatively low optical damping.

This object is achieved according to the invention by means of an injection modulator having the features as claimed in patent claim 1. Advantageous configurations of the modulator according to the invention are specified in dependent claims.

Accordingly, it is provided according to the invention that p-doped semiconductor portions lie on one side of the waveguide—as viewed in the longitudinal direction of the waveguide and relative to the waveguide center —, n-doped semiconductor portions lie on the other side of the waveguide and an intermediate portion lies in the region of the waveguide center, the semiconductor portions extend in each case transversely with respect to the waveguide longitudinal direction in the direction of the waveguide center of the waveguide, and the p-doped semiconductor portions—as viewed in the longitudinal direction of the waveguide—are in each case free of overlap with the n-doped semiconductor portions.

A significant advantage of the injection modulator according to the invention can be seen in the fact that the p-doped semiconductor portions and the n-doped semiconductor portions may be doped relatively highly as a result of their arrangement according to the invention, such that it is possible to achieve a relatively strong electro-optical effect in the waveguide. In this case, owing to their overlap-free arrangement, the highly doped semiconductor portions cause only little additional damping.

The p-doped semiconductor portions and the n-doped semiconductor portions are preferably respectively electrically connected in parallel.

Regarding the configuration of the waveguide and the diode structure, it is considered to be particularly advantageous if the waveguide is a ridge waveguide comprising a waveguiding elevated ridge portion and two adjacent web portions running parallel to the ridge portion as viewed in the ridge longitudinal direction, the p-doped semiconductor portions are located in one of the two web portions, the n-doped semiconductor portions are located in the other of the two web portions, and at least the center of the ridge portion is free of the p- and n-doped semiconductor portions.

With regard to a minimum waveguide damping in the modulation region, it is considered to be advantageous if the entire ridge portion is free of the p- and n-doped semiconductor portions.

With regard to a particularly high electric field strength in the waveguide region, it is considered to be advantageous if the p-doped semiconductor portions form tine portions of a p-doped comb structure, the tines of which are arranged at a distance from one another in the waveguide longitudinal direction and extend in each case proceeding from a common contact connection, located outside the waveguide, from the outside transversely with respect to the waveguide longitudinal direction in the direction of the waveguide center of the waveguide, and the n-doped semiconductor portions form tine portions of an n-doped comb structure, the tines of which are arranged at a distance from one another in the waveguide longitudinal direction and extend proceeding from a common contact connection, located outside the waveguide, in each case from the outside transversely with respect to the waveguide longitudinal direction in the direction of the waveguide center of the waveguide.

Preferably, the ridge waveguide comprises a waveguiding layer and an underlying lower cladding layer. In the case of such a configuration of the ridge waveguide it is advantageous if the doping of the n-doped semiconductor portions and that of the p-doped semiconductor portions extend in each case from the surface of the waveguiding layer of the ridge waveguide as far as the lower cladding layer.

Preferably, the width of the p-doped and that of the n-doped semiconductor portions are in each case smaller than the distance between adjacent semiconductor portions of the same doping; such a configuration keeps the waveguide damping in the waveguide small. Particularly preferably, the ratio between the width of the semiconductor portions and the distance between adjacent semiconductor portions is less than ¼.

With regard to the configuration and arrangement of the semiconductor portions it is considered to be advantageous if the p-doped semiconductor portions form constituents of a first comb structure and the n-doped semiconductor portions form constituents of a second comb structure. The comb spines of the two comb structures are preferably aligned parallel to the waveguide and are preferably in each case at a distance from the elevated ridge portion of the ridge waveguide.

The comb spines preferably in each case are formed by or preferably at least also comprise a metallic contact connection. Below the contact connections, the semiconductor material is preferably likewise doped. Further layers, consisting of silicide, for example, may be located between the contact connections and the semiconductor material.

With regard to minimal waveguide losses, it is considered to be advantageous if the doping in the region of the intermediate portion is so low that the intrinsic charge carrier density in the weakly doped or undoped intermediate portion is greater than the doping in the intermediate portion.

In order to ensure a uniform modulation in the modulation region, it is considered to be advantageous if the injection modulator is resonator-free and the waveguide overall is resonance-free.

Likewise with regard to a uniform modulation in the waveguide longitudinal direction, it is considered to be advantageous if the p-doped semiconductor portions and the n-doped semiconductor portions—as viewed in the longitudinal direction of the waveguide—are arranged offset with respect to one another by half a distance between adjacent semiconductor portions. In other words, it is advantageous if at least one of the p-doped semiconductor portions—as viewed in the longitudinal direction of the waveguide—is arranged centrally between two n-doped semiconductor portions lying obliquely opposite, and at least one of the n-doped semiconductor portions—as viewed in the longitudinal direction of the waveguide—is arranged centrally between two p-doped semiconductor portions lying obliquely opposite.

In one particularly preferred configuration of the injection modulator, it is provided that the p-doped semiconductor portions form a p-doped comb structure or constituents thereof and the n-doped semiconductor portions form an n-doped comb structure or constituents thereof. The p-doped comb structure is preferably arranged on one side of the waveguide and the n-doped comb structure is arranged on the other side of the waveguide. The tines of the two comb structures are preferably aligned in each case in the direction of the waveguide center of the waveguide. The tines of the p-doped comb structure are free of overlap with those of the n-doped comb structure—as viewed in the longitudinal direction of the waveguide.

The waveguide center, preferably the entire waveguide, is preferably free of tines. In the case of a ridge waveguide, preferably the entire elevated ridge portion of the ridge waveguide is free of tines.

Regarding the configuration of the tines, it is considered to be advantageous if the width of the tines is both at least four times smaller than the length of the tines and at least four times smaller than the distance between adjacent tines.

The waveguide of the injection modulator preferably forms an MZI (Mach-Zehnder Interferometer) structure. In the case of such a configuration, it is considered to be advantageous if at least one of the arms of the MZI structure is equipped with a diode structure for injecting charge carriers.

Alternatively, the waveguide of the injection modulator may be arranged in a ring of a ring modulator.

The invention furthermore relates to an arrangement comprising an injection modulator such as has been described above, and a radiation source.

In the case of such an arrangement it is advantageous if the distance between the p-doped semiconductor portions among one another and the distance between the n-doped semiconductor portions among one another are in each case greater or less than half of the wavelength of the radiation of the radiation source or are greater or less than an integer multiple of said half. A distance between the semiconductor portions which is greater or less than half of the wavelength of the radiation ensures that as a result of the p- and n-doped semiconductor portions it is not possible for resonance formation to occur within the modulated waveguide portion and a uniform modulation—as viewed in the waveguide longitudinal direction—is achieved.

The invention furthermore relates to a method for modulating optical radiation, wherein, with an injection diode structure, charge carriers are injected into a resonance-free portion of a waveguide, in which—apart from waveguide damping—the radiation intensity of the radiation guided in the waveguide is constant, or previously injected charge carriers are extracted therefrom.

According to the invention, regarding such a method it is provided that the injection or extraction of holes is performed from one side of the waveguide and the injection or extraction of electrons is performed from the other side of the waveguide by means of a diode structure comprising at least two p-doped semiconductor portions, at least two n-doped semiconductor portions and at least one weakly doped or undoped intermediate portion between the p-doped and n-doped semiconductor portions, wherein the p-doped semiconductor portions lie on one side of the waveguide—as viewed in the waveguide longitudinal direction and relative to the waveguide center —, the n-doped semiconductor portions lie on the other side of the waveguide and the intermediate portion lies in the region of the waveguide center, wherein the semiconductor portions extend in each case transversely with respect to the waveguide longitudinal direction in the direction of the waveguide center of the waveguide, and wherein the p-doped semiconductor portions—as viewed in the longitudinal direction of the waveguide—are both offset and free of overlap in each case relative to the n-doped semiconductor portions.

Regarding the advantages of the method according to the invention, reference should be made to the above explanations in association with the injection modulator according to the invention.

The invention is explained in greater detail below on the basis of exemplary embodiments; in the figures here by way of example.

In the figures, the same reference signs are always used for identical or comparable components, for the sake of clarity.

Figure 1:
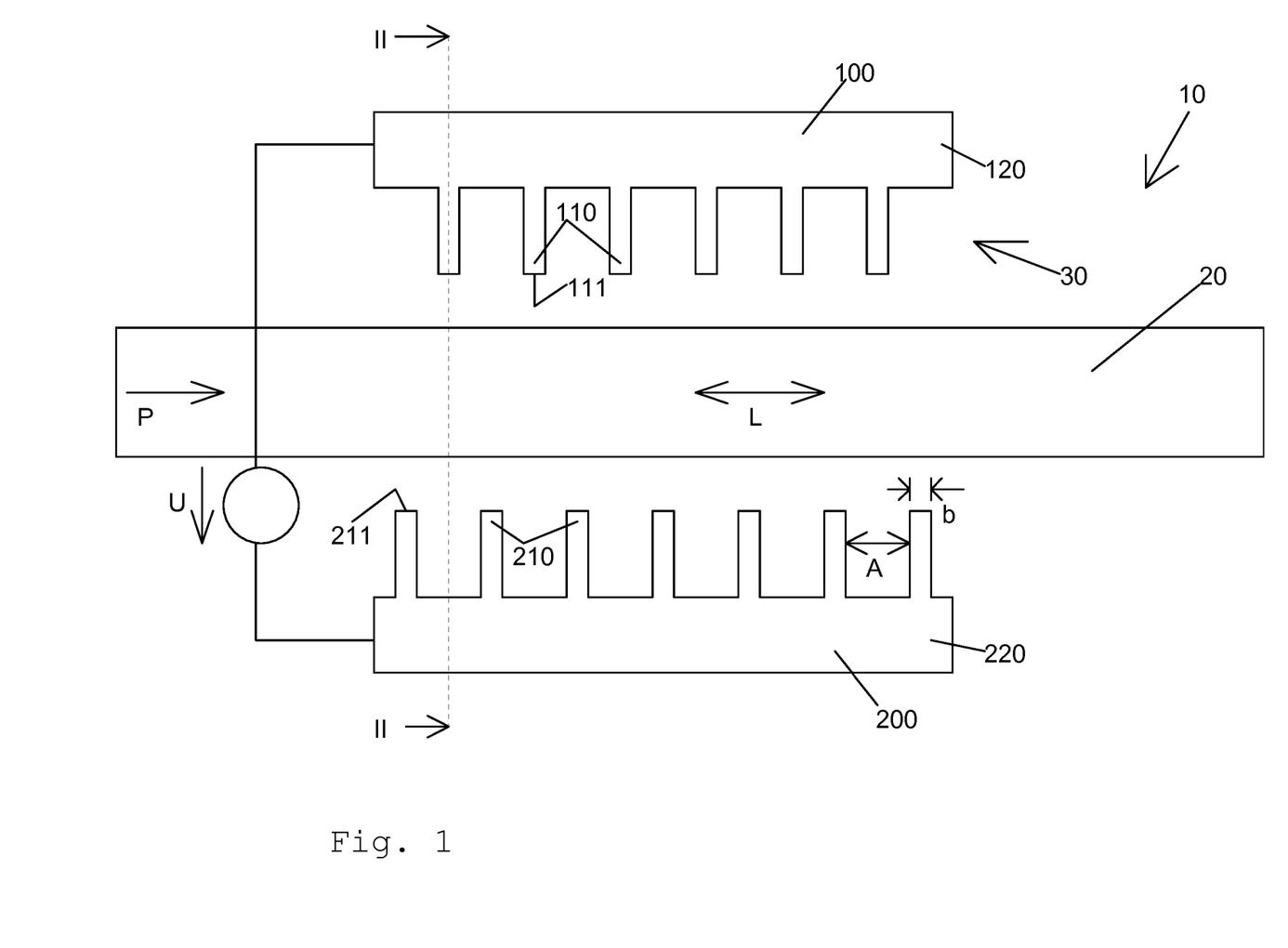
FIG. 1 shows one exemplary embodiment of an injection modulator in which comb structures of an injection diode structure are arranged outside a waveguide to be modulated.

FIG. 1 shows an injection modulator 10 comprising an optical waveguide 20 and a diode structure 30. The diode structure 30 comprises a first comb structure 100, an upper comb structure in FIG. 1, for injecting holes and a second comb structure 200, a lower comb structure in FIG. 1, for injecting electrons.

The first comb structure 100 is equipped with p-doped semiconductor portions 110 extending in the direction of the waveguide 20 in finger-shaped fashion proceeding from a comb spine 120. The direction of extent of the p-doped semiconductor portions 110 in the direction of the waveguide 20 is preferably perpendicular proceeding from the longitudinal direction L of the comb spine 120 or relative to the longitudinal direction L of the waveguide 20. The longitudinal direction L of the comb spine 120 and the longitudinal direction L of the waveguide 20 are preferably parallel. The longitudinal direction L of the waveguide 20 corresponds to the direction of propagation of the optical radiation P guided therein.

The p-doped semiconductor portions 110 arranged in a spaced-apart manner and preferably parallel to one another thus illustratively form the tines of the comb structure 100, the tips 111 of which serve for injecting holes as soon as the diode structure 30 is activated.

The second comb structure 200 is equipped with n-doped semiconductor portions 210 extending in the direction of the waveguide 20 proceeding from a comb spine 220 perpendicularly to the longitudinal direction L of the comb spine 220 and perpendicularly to the longitudinal direction L of the waveguide 20. The n-doped semiconductor portions 210 are arranged in a spaced-apart manner and preferably parallel to one another and serve—during the operation of the diode structure 30—with their tips 211 for injecting or extracting holes into or out of the waveguide 20.

In order to achieve a uniform modulation of the radiation guided in the waveguide 20, the diode structure 30 is preferably arranged in a resonance-free portion of the waveguide 20, in which—apart from waveguide damping—the radiation intensity of the radiation P guided in the waveguide 20 is at least approximately constant.

Likewise with regard to a uniform modulation of the radiation P guided in the waveguide 20, in the exemplary embodiment in accordance with FIG. 1 it is provided that the p-doped semiconductor portions 110 of the first comb structure 100 are offset relative to the n-doped semiconductor portions 210 of the second comb structure 200. Preferably, the offset is chosen in such a way that tips 111 of the p-doped semiconductor portions 110 lie in each case between the tips 211 of the n-doped semiconductor portions 210 and tips 211 of the n-doped semiconductor portions 210 lie in each case between assigned tips 111 of the p-doped semiconductor portions 110, as is shown in FIG. 1.

The comb spine 120 of the first comb structure 100 is preferably formed by a p-doped semiconductor portion provided wholly or at least in portions with a metallic contact connection. The comb spine 220 is correspondingly preferably formed by n-doped semiconductor material provided wholly or at least in portions with metallic contact connections.

The injection modulator 10 in accordance with FIG. 1 can be operated for example as follows:

In order to inject charge carriers into the region of the waveguide 20, a forward voltage is applied to the diode structure 30 by means of a voltage or current source U, as a result of which, on the part of the p-doped semiconductor portions 110, holes are emitted in the direction of the waveguide 20 and in the direction of the second comb structure 200 and, on the part of the n-doped semiconductor portions 210, electrons are emitted in the direction of the waveguide 20 and in the direction of the p-doped semiconductor portions 110. The holes and electrons injected into the region of the waveguide 20 modify the refractive index within the waveguide 20, such that a phase modulation and—on account of the charge carriers—also a certain damping of the radiation guided in the waveguide 20 occur.

If the injected charge carriers are intended to be extracted as rapidly as possible from the region of the waveguide 20 in order to bring about a switchover of the modulation, then a reverse voltage is preferably applied to the diode structure 30, as a result of which the holes and electrons located in the region of the waveguide 20 are extracted by the first comb structure 100 and the second comb structure 200.

Figure 2:
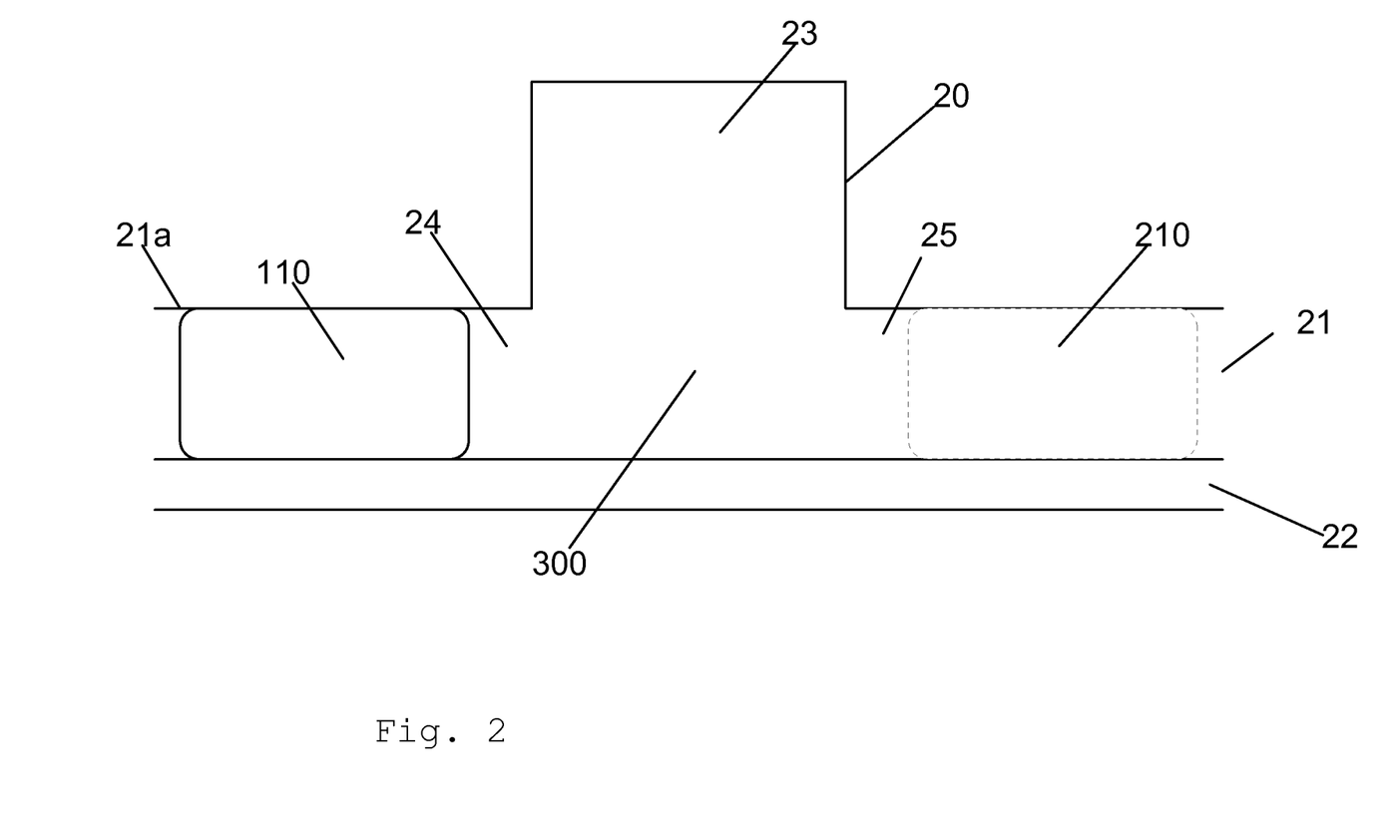
FIG. 2 shows the injection modulator in accordance with FIG. 1 in cross section.

FIG. 2 shows the injection modulator 10 in accordance with FIG. 1 in a sectional view along the sectional line II-II in accordance with FIG. 1.

It can be discerned that the waveguide 20 is preferably a ridge waveguide embodied in a waveguiding layer 21. The waveguiding layer 21 is located on a lower cladding layer 22, which has a smaller refractive index than the waveguiding layer 21 for the purpose of waveguiding in the vertical direction.

For the purpose of lateral waveguiding, the waveguide 20 is provided with a ridge portion 23 adjoined by two web portions 24 and 25 on the left and right—as viewed in the longitudinal direction of the waveguide. The web height of the web portions 24 and 25 is smaller than the height in the ridge portion 23.

FIG. 2 furthermore shows the arrangement of the p-doped semiconductor portions 110 and of the n-doped portions 210. On account of the sectional plane chosen, only the p-doped semiconductor portion 110 is located in the illustrated plane, and so only this portion is illustrated with a solid line. The n-doped semiconductor portion 210 is arranged spatially behind the p-doped semiconductor portion 110 along the chosen viewing direction and is therefore illustrated merely with a dashed line.

In other words, the type of lines chosen in FIG. 2 is used to graphically visualize the fact that the p-doped semiconductor portions 110 and the n-doped semiconductor portions 210 are not located in the same plane, but rather are offset relative to one another, as has already been mentioned in association with FIG. 1.

In the exemplary embodiment in accordance with FIGS. 1 and 2, with regard to a minimum damping of the radiation guided in the waveguide 20, the arrangement of the two comb structures 100 and 200 is chosen in such a way that the tips 111 and 211 of the p-doped semiconductor portions 110 and of the n-doped semiconductor portions 210, respectively, always lie outside the ridge portion 23 of the waveguide 20.

With regard to injecting electrons and holes as efficiently as possible, the doping of the p-doped semiconductor portions 110 and that of the n-doped semiconductor portions 210 are chosen in such a way as to extend down to the lower cladding layer 22 proceeding from the surface 21a of the waveguiding layer 21. This doping depth ensures that the waveguide 20 can be filled uniformly with charge carriers in the region of the entire web height of the web portions 24 and 25.

Figure 3:
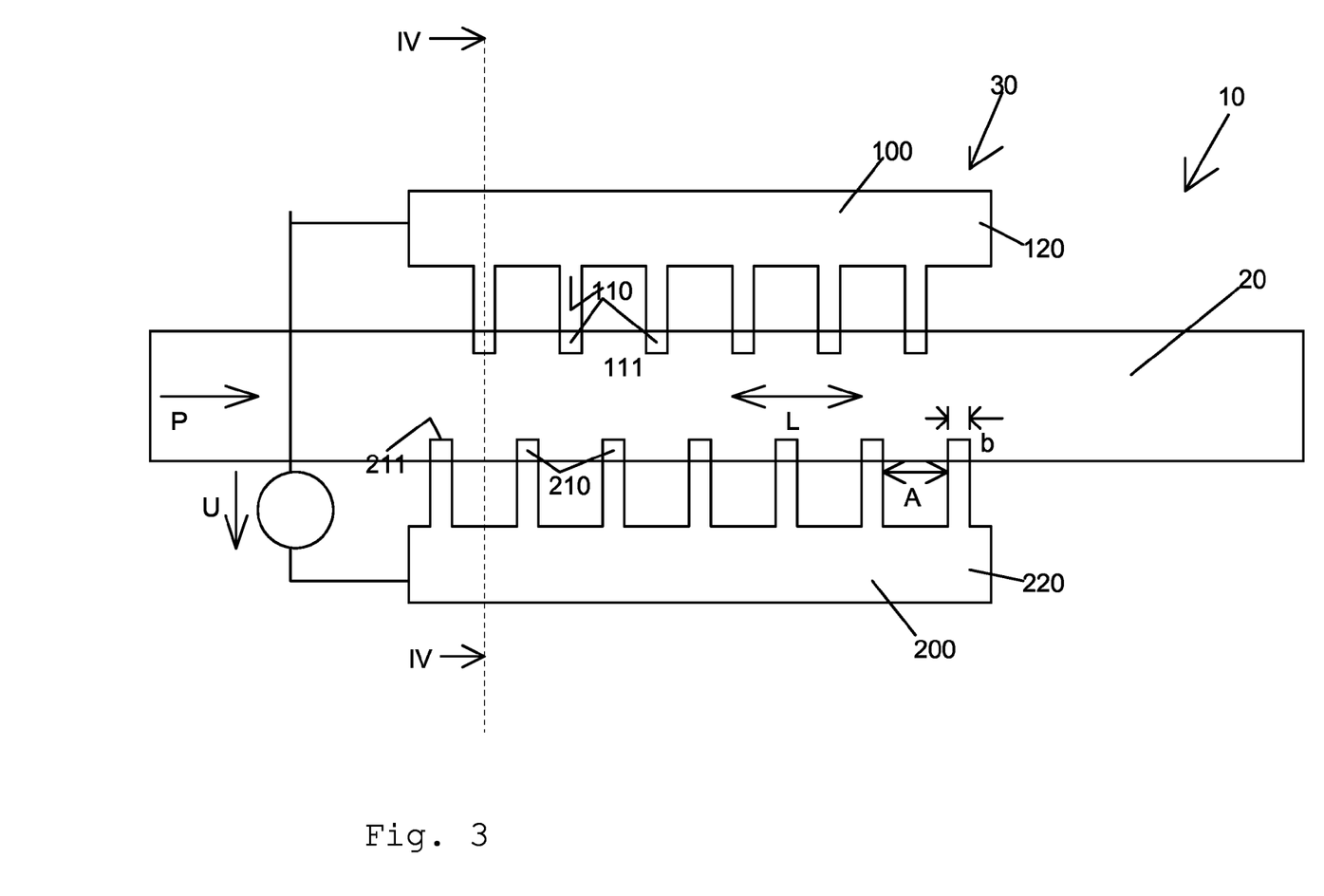
FIG. 3 shows one exemplary embodiment of an injection modulator in which the semiconductor portions extend into the waveguide region.

FIG. 3 shows one exemplary embodiment of an injection modulator which corresponds to the injection modulator 10 in accordance with FIGS. 1 and 2 in terms of construction. In contrast to the injection modulator in accordance with FIGS. 1 and 2, the two comb structures 100 and 200 of the diode structure 30 are arranged nearer to the waveguide 20. In this regard, it can be discerned in FIG. 3 that the tips 111 and 211 of the p-doped semiconductor portions 110 and of the n-doped semiconductor portions 210, respectively, of the two comb structures 100 and 200 project right into the waveguide 20. Only the comb spines 120 and 220 of the two comb structures 100 and 200 are located outside the waveguide 20.

On account of the smaller distance between the p-doped semiconductor portions 110 and the n-doped semiconductor portions 210, during operation of the diode structure 30 it is possible to achieve a greater electric field strength within the waveguide 20, a higher modulation speed as a result of faster injection and extraction of previously injected charge carriers, and also a higher charge carrier density within the waveguide 20. What is disadvantageous is the higher damping of the optical radiation P in the waveguide 20 that is brought about by those portions of the p-doped semiconductor portions 110 and of the n-doped semiconductor portions 210 which project into the waveguide 20; this is because the tine ends of the two comb structures 100 and 200 increase the waveguide damping.

In order to minimize the damping, the width b of the semiconductor portions 110 and 210 is chosen to be very much smaller than the distance A between the semiconductor portions.

For the rest, the explanations in association with FIGS. 1 and 2 correspondingly apply in the case of the exemplary embodiment in accordance with FIG. 3.

Figure 4:
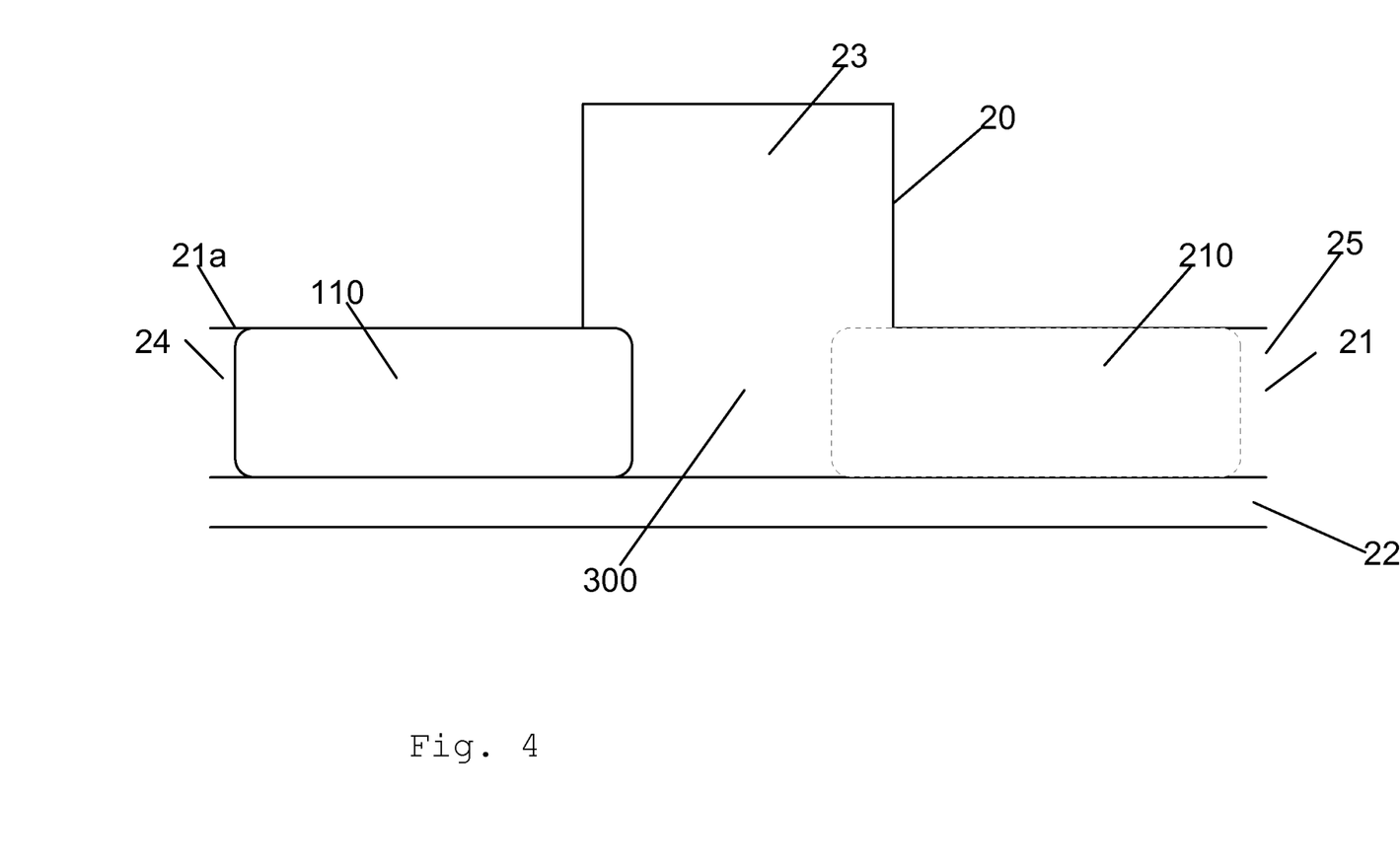
FIG. 4 shows the injection modulator in accordance with FIG. 3 in cross section.

FIG. 4 shows the injection modulator 10 in accordance with FIG. 3 along the sectional line IV-IV in cross section. It can be discerned that the p-doped semiconductor portions 110 and the n-doped semiconductor portions 210 extend right into the ridge portion 23 of the waveguide 20 proceeding from the web portions 24 and 25, respectively. A weakly doped or undoped intermediate structure 300 nevertheless remains between the semiconductor portions 110 and 210, said intermediate structure separating the semiconductor portions from one another and the optical radiation—at least the main part of the optical radiation—being guided in said intermediate structure.

In FIG. 4 it can likewise be discerned that the n-doped semiconductor portions 210 are offset relative to the p-doped semiconductor portions 110 along the waveguide longitudinal direction. This is visualized by a dashed line for the n-doped semiconductor portion 210 in FIG. 4.

Figure 5:
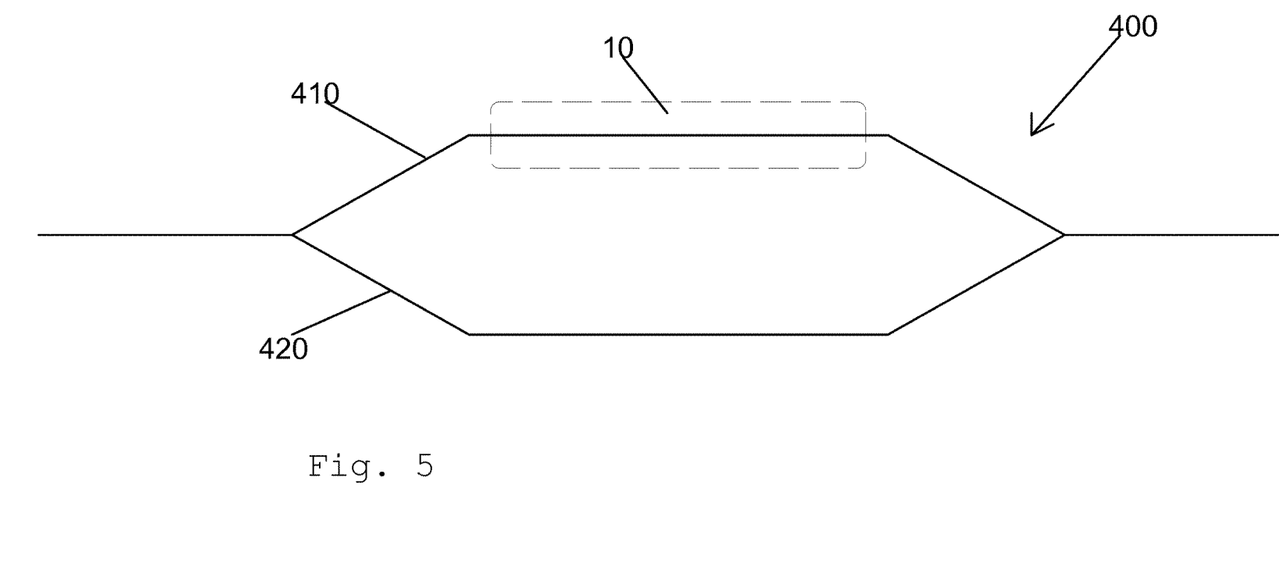
FIG. 5 shows one exemplary embodiment of an injection modulator in which a waveguide that is modulatable by means of a diode structure forms a Mach-Zehnder interferometer structure.

FIG. 5 shows one exemplary embodiment of an MZI modulator 400 comprising two interferometer arms 410 and 420. One of the interferometer arms, for example the interferometer arm 410, is equipped with an injection modulator 10 such as has been explained above by way of example in FIGS. 1 to 4.

Once the injection modulator 10 is activated, it is possible to alter the phase of the radiation guided in the interferometer arm 410 relative to the phase of the radiation guided in the interferometer arm 420, such that an amplitude modulation occurs at the output of the MZI modulator 400.

Figure 6:
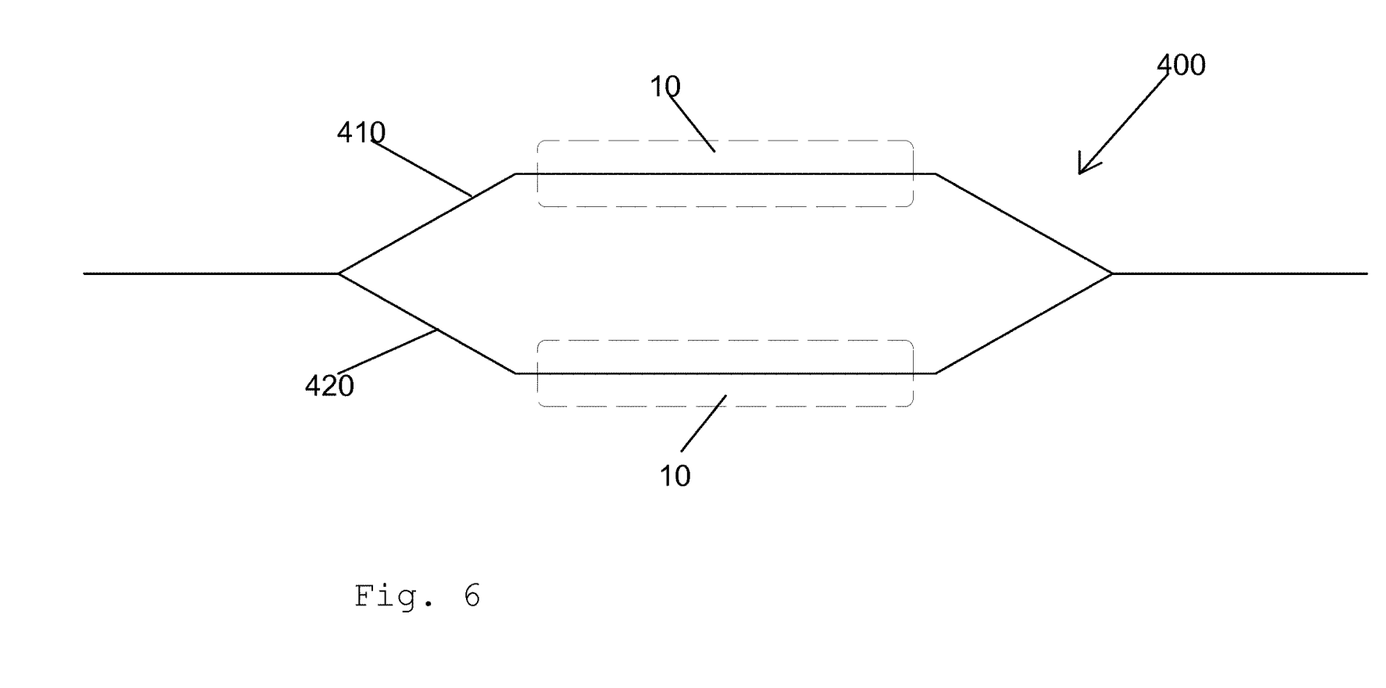
FIG. 6 shows a further exemplary embodiment of an injection modulator in which an optical waveguide forms a Mach-Zehnder interferometer structure, wherein both arms of the interferometer structure are equipped with a diode structure.

FIG. 6 shows one exemplary embodiment of an MZI modulator 400 in which both interferometer arms 410 and 420 are each equipped with an injection modulator 10 such as has been explained above in association with FIGS. 1 to 4.

Figure 7:
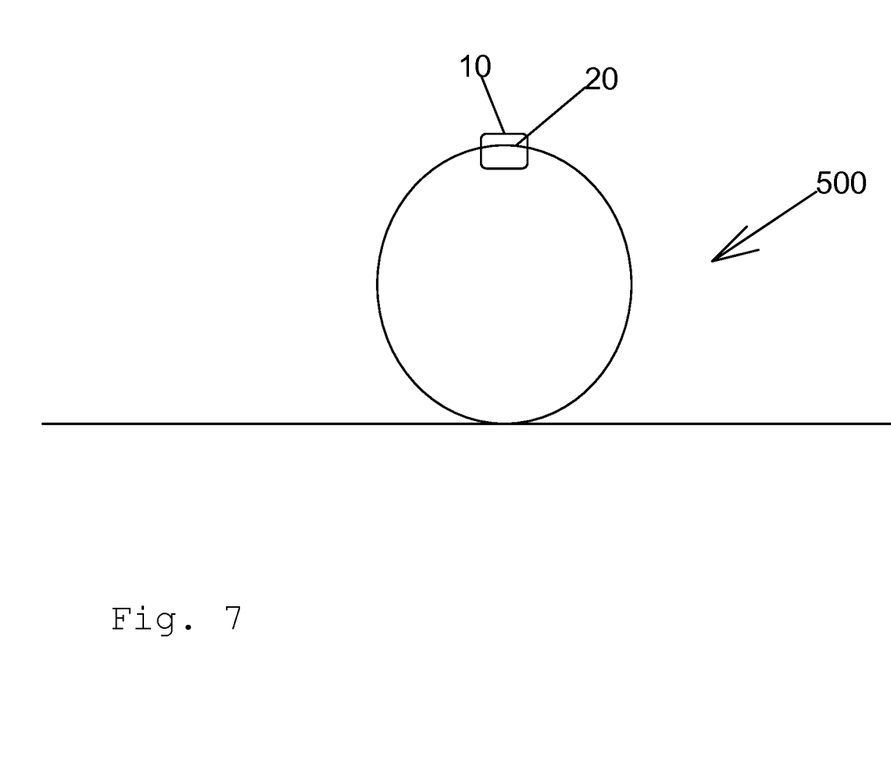
FIG. 7 shows one exemplary embodiment of a ring resonator in which a resonance-free portion of a waveguide is equipped with a diode structure.

FIG. 7 shows one exemplary embodiment of a ring modulator 500 in which a waveguide 20 forms a ring resonator. An injection modulator 10 such as has been explained in association with FIGS. 1 to 4 is provided in a resonator-free portion of the waveguide 20. The explanations above thus correspondingly apply to the modulator 10 in accordance with FIG. 7.

Although the invention has been more specifically illustrated and described in detail by means of preferred exemplary embodiments, nevertheless the invention is not restricted by the examples disclosed and other variations can be derived therefrom by the person skilled in the art, without departing from the scope of protection of the invention.

LIST OF REFERENCE SIGNS

10 Injection modulator
20 Waveguide

21 Layer
21a Surface
22 Cladding layer
23 Ridge portion
24 Web portion
25 Web portion
30 Diode structure
100 Upper comb structure
110 P-doped semiconductor portion
111 Tips
120 Comb spine
200 Lower comb structure
210 N-doped semiconductor portion
211 Tips
220 Comb spine
300 Intermediate portion
400 MZI modulator
410 Interferometer arm
420 Interferometer arm
500 Ring modulator
A Distance
b Width
L Longitudinal direction
P Optical radiation
U Voltage/current source

The invention claimed is:

1. An injection modulator for modulating optical radiation comprising:
an optical waveguide and
a diode structure comprising at least two p-doped semiconductor portions, at least two n-doped semiconductor portions and at least one weakly doped or undoped intermediate portion between the p-doped and n-doped semiconductor portions, wherein
the p-doped semiconductor portions as viewed in the longitudinal direction of the waveguide are arranged offset relative to the n-doped semiconductor portions, and
the diode structure is arranged in a resonance-free portion of the waveguide, in which apart from waveguide damping the radiation intensity of the radiation guided in the waveguide is constant,
wherein
the p-doped semiconductor portions lie on one side of the waveguide as viewed in the longitudinal direction of the waveguide and relative to the waveguide center, the n-doped semiconductor portions lie on the other side of the waveguide and the intermediate portion lies in the region of the waveguide center,
the semiconductor portions extend in each case transversely with respect to the waveguide longitudinal direction in the direction of the waveguide center of the waveguide, and
the p-doped semiconductor portions as viewed in the longitudinal direction of the waveguide are in each case free of overlap with the n-doped semiconductor portions.

2. The injection modulator as claimed in claim 1, wherein
the waveguide is a ridge waveguide comprising a waveguiding elevated ridge portion and two adjacent web portions running parallel to the ridge portion as viewed in the ridge longitudinal direction,
the p-doped semiconductor portions are located in one of the two web portions,
the n-doped semiconductor portions are located in the other of the two web portions, and
at least the center of the ridge portion is free of the p- and n-doped semiconductor portions.

3. The injection modulator as claimed in claim 2, wherein the entire ridge portion is free of the p- and n-doped semiconductor portions.

4. The injection modulator as claimed in claim 2, wherein
the p-doped semiconductor portions form constituents of a first comb structure,
the n-doped semiconductor portions form constituents of a second comb structure, and
the comb spines of the two comb structures are aligned in each case parallel to the waveguide and are in each case at a distance from the elevated ridge portion of the ridge waveguide.

5. The injection modulator as claimed in claim 4, wherein the comb spines in each case are formed by or comprise a metallic contact connection.

6. The injection modulator as claimed in claim 1, wherein
the p-doped semiconductor portions form tine portions of a p-doped comb structure, the tines of which are arranged at a distance from one another in the waveguide longitudinal direction and extend in each case proceeding from a common contact connection, located outside the waveguide, from the outside transversely with respect to the waveguide longitudinal direction in the direction of the waveguide center of the waveguide, and
the n-doped semiconductor portions form tine portions of an n-doped comb structure, the tines of which are arranged at a distance from one another in the waveguide longitudinal direction and extend proceeding from a common contact connection, located outside the waveguide, in each case from the outside transversely with respect to the waveguide longitudinal direction in the direction of the waveguide center of the waveguide.

7. The injection modulator as claimed in claim 1, wherein
the ridge waveguide comprises a waveguiding layer and an underlying lower cladding layer, and
the doping of the n-doped semiconductor portions and that of the p-doped semiconductor portions extend in each case from the surface of the waveguiding layer of the ridge waveguide as far as the lower cladding layer.

8. The injection modulator as claimed in claim 1, wherein
the width of the p-doped semiconductor portions is in each case smaller than the distance between adjacent p-doped semiconductor portions, and
the width of the n-doped semiconductor portions is in each case smaller than the distance between adjacent n-doped semiconductor portions.

9. The injection modulator as claimed in claim 1, wherein the doping in the weakly doped or undoped intermediate portion is less than the intrinsic charge carrier density in the intermediate portion.

10. The injection modulator as claimed in claim 1, wherein the injection modulator is resonator-free and the waveguide overall is resonance-free.

11. The injection modulator as claimed in claim 1, wherein
at least one of the p-doped semiconductor portions as viewed in the longitudinal direction of the waveguide is arranged centrally between two n-doped semiconductor portions lying obliquely opposite, and
at least one of the n-doped semiconductor portions as viewed in the longitudinal direction of the waveguide is arranged centrally between two p-doped semiconductor portions lying obliquely opposite.

12. The injection modulator as claimed in claim 1, wherein
- the p-doped semiconductor portions form a p-doped comb structure or constituents thereof and the n-doped semiconductor portions form an n-doped comb structure or constituents thereof,
- the p-doped comb structure is arranged on one side of the waveguide and the n-doped comb structure is arranged on the other side of the waveguide, and
- the tines of the two comb structures are aligned in each case in the direction of the waveguide center of the waveguide.

13. The injection modulator as claimed in claim 1, wherein
- the waveguide forms an MZI modulator, and
- at least one of the arms of the MZI modulator is equipped with a diode structure for injecting charge carriers.

14. An arrangement comprising an injection modulator as claimed in claim 1, and a radiation source, wherein the distance between the p-doped semiconductor portions among one another and the distance between the n-doped semiconductor portions among one another are in each case greater or less than half of the wavelength of the radiation of the radiation source or are greater or less than an integer multiple of said half.

15. A method for modulating optical radiation, wherein, with an injection diode structure, charge carriers are injected into a resonance-free portion of a waveguide, in which apart from waveguide damping the radiation intensity of the radiation guided in the waveguide is constant, or previously injected charge carriers are extracted therefrom, wherein
- the injection or extraction of holes is performed from one side of the waveguide and the injection or extraction of electrons is performed from the other side of the waveguide by means of a diode structure comprising at least two p-doped semiconductor portions, at least two n-doped semiconductor portions and at least one weakly doped or undoped intermediate portion between the p-doped and n-doped semiconductor portions,
- wherein the p-doped semiconductor portions lie on one side of the waveguide as viewed in the waveguide longitudinal direction and relative to the waveguide center, the n-doped semiconductor portions lie on the other side of the waveguide and the intermediate portion lies in the region of the waveguide center,
- wherein the semiconductor portions extend in each case transversely with respect to the waveguide longitudinal direction in the direction of the waveguide center of the waveguide, and
- wherein the p-doped semiconductor portions as viewed in the longitudinal direction of the waveguide are both offset and free of overlap in each case relative to the n-doped semiconductor portions.

\* \* \* \* \*

UNITED STATES PATENT AND TRADEMARK OFFICE
CERTIFICATE OF CORRECTION

PATENT NO.         : 9,817,295 B2
APPLICATION NO.    : 15/512873
DATED              : November 14, 2017
INVENTOR(S)        : Stefan Meister et al.

Page 1 of 1

It is certified that error appears in the above-identified patent and that said Letters Patent is hereby corrected as shown below:

In the Claims

Column 11, Lines 23-24, Claim 14:
After "of the radiation"
Delete "of the radiation" (second occurrence)

Signed and Sealed this
Twentieth Day of March, 2018

Andrei Iancu
*Director of the United States Patent and Trademark Office*